(No Model.)
N. H. FALK.
GOLD SAVING APPARATUS.
No. 250,223. Patented Nov. 29, 1881.
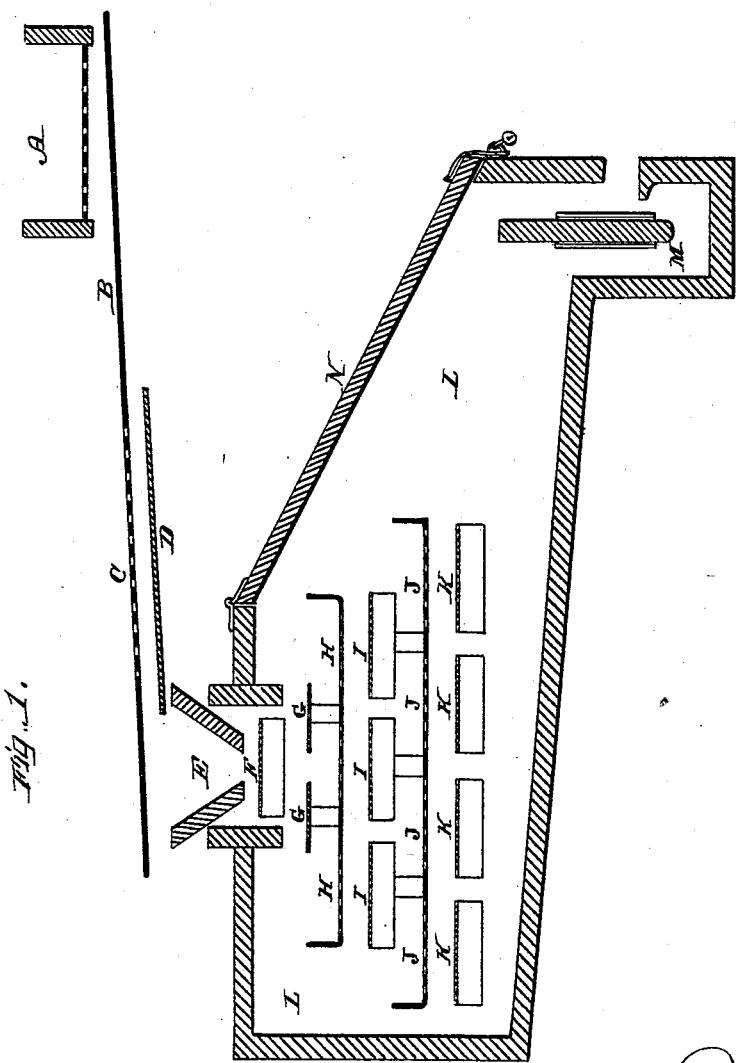
Witnesses
Geo. H. Strong.
Frank A. Brooks
Inventor
Noah H. Falk
By Dewey & Co.
Attys

UNITED STATES PATENT OFFICE.

NOAH H. FALK, OF ARCATA, CALIFORNIA.

GOLD-SAVING APPARATUS.

SPECIFICATION forming part of Letters Patent No. 250,223, dated November 29, 1881.

Application filed August 11, 1881. (No model.)

*To all whom it may concern:*

Be it known that I, NOAH H. FALK, of Arcata, county of Humboldt, State of California, have invented a Gold-Saving Apparatus; and I hereby declare the following to be a full, clear, and exact description thereof.

My invention relates to certain improvements in apparatus for saving gold and other valuable metals in a native state, and it is especially applicable to the saving of fine or float gold, such as may be found in placer or hydraulic mines, and the particles of mercury which may be carried through a sluice or lost from other forms of apparatus.

It consists in the employment of a series of horizontal amalgamated plates, upon which the earth and water fall from a small height, passing through screens after being subdivided and separated by a series of horizontal plates or tables, upon which it falls from the hopper into which it is received from the sluices or other conveyer. These plates and screens are inclosed in a box, so that the whole may be locked and secured, and the discharge is made through a mercury-trap at the lower end of the box.

Referring to the accompanying drawings for a more complete explanation of my invention, Figure 1 is a vertical transverse section of my apparatus.

A is a sluice of ordinary construction, having a screen or "grizzly," as it is called, in the bottom, through which the finer sand, gold, &c., fall into the under-current B, while the large stones are carried on down the sluice. The under-current B has a screen-bottom, C, through which the finest sand and the valuable portions fall into a common sluice, D, which delivers them into a hopper, E, or the earth may be brought in any other manner, this being the commencement of my apparatus proper.

Just beneath the hopper is a horizontal table or plate, F, upon which the earth and water fall, and are by it divided and caused to flow off upon each side, where they fall upon two other plates, G, which again subdivide the material and deliver it upon the screen H. This screen separates the material into fine streams, which fall a very short distance upon the horizontal copper or amalgamated plates I. I have found that about an inch and a quarter gives sufficient fall to bring all the precious metal into intimate contact with the plate without producing that tendency to "scour," as it is termed, which a rapid current or a high fall will do. From this first series of plates the material falls upon a second screen, J, through which it passes, and is received upon the second series of amalgamated plates K, also placed horizontally, but a small distance below the screen. This apparatus is all placed in a box, L, which has an inclined bottom, over which the residue passes to the quicksilver-trap M, where the last remnant of gold may be saved, and from which the useless tailings will escape. The front or side of this box has an inclined hinged door, N, through which the plates may be removed to be cleaned up or examined at any time. This gate or door is kept locked, so that no person can get at the plates without a key. By thus subdividing the material and allowing it to fall a short distance upon the horizontal amalgamated plates it will be brought into intimate contact with the surface, and will be caught and saved, and there will be no tendency to scour the plates.

It will be seen that any number of distributing-plates G or amalgamating-plates I K may be used, either in one or more series, according to the difficulty in saving the gold.

Broadly the use of distributer-screens combined with amalgamating-plates and a quicksilver-trap is not new, and such, therefore, I do not claim; but what I do claim is the specific construction and arrangement shown and described, and hereinafter specifically set forth in the claims.

Having thus described my invention, what I claim as new, and desire to secure by Letters Patent, is—

1. The horizontal amalgamated plates I K, the screens H J, and the imperforate distributing plates or tables F G, substantially as and for the purpose herein described.

2. The imperforate distributing-plates F G, placed beneath the receiving-hopper, the screens, and the horizontal amalgamating-plates just beneath them, in combination with the box L, with its inclined bottom, quicksilver-trap, and door, substantially as and for the purpose herein described.

In witness whereof I have hereunto set my hand.

NOAH H. FALK.

Witnesses:
S. H. NOURSE,
FRANK A. BROOKS.